(12) United States Patent
Guo et al.

(10) Patent No.: US 12,184,433 B2
(45) Date of Patent: Dec. 31, 2024

(54) HYBRID AUTOMATIC REPEAT REQUEST (HARQ) CODEBOOK ENHANCEMENT AND PHYSICAL UPLINK CONTROL CHANNEL (PUCCH) RESOURCE DETERMINATION WITH SIDELINK FEEDBACK FORWARDING

(71) Applicant: QUALCOMM Incorporated, San Diego, CA (US)

(72) Inventors: Hui Guo, Beijing (CN); Sudhir Kumar Baghel, Pleasanton, CA (US); Kapil Gulati, Belle Mead, NJ (US); Tien Viet Nguyen, Bridgewater, NJ (US); Shuanshuan Wu, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 17/755,216

(22) PCT Filed: Oct. 25, 2019

(86) PCT No.: PCT/CN2019/113270
§ 371 (c)(1),
(2) Date: Apr. 22, 2022

(87) PCT Pub. No.: WO2021/077400
PCT Pub. Date: Apr. 29, 2021

(65) Prior Publication Data
US 2022/0393805 A1    Dec. 8, 2022

(51) Int. Cl.
*H04L 1/1867* (2023.01)
*H04L 1/1812* (2023.01)
(Continued)

(52) U.S. Cl.
CPC .......... *H04L 1/1887* (2013.01); *H04L 1/1812* (2013.01); *H04L 1/1854* (2013.01); *H04W 72/21* (2023.01); *H04W 72/23* (2023.01)

(58) Field of Classification Search
CPC ... H04L 1/1887; H04L 1/1812; H04L 1/1854; H04L 2001/0092; H04L 1/1861; H04L 1/1896; H04W 72/21; H04W 72/23
See application file for complete search history.

(56) References Cited

U.S. PATENT DOCUMENTS

2016/0381672 A1   12/2016 Kim et al.
2021/0105126 A1*  4/2021 Yi .................... H04L 1/1671
(Continued)

FOREIGN PATENT DOCUMENTS

CN    110166181 A    8/2019
CN    110311762 A    10/2019
(Continued)

OTHER PUBLICATIONS

Ericsson: "Feature Lead Summary#3 on Resource Allocation for NR Sidelink Mode1", R1-1911713, 3GPP TSG-RAN WG1 Meeting #98bis, 3rd Generation Partnership Project, Mobile Competence Centre, 650, Route Des Lucioles, F-06921 vol. RAN WG1. no. Chongqing, China, Oct. 14, 2019-Oct. 20, 2019, Oct. 22, 2019 (Oct. 22, 2019), XP051798955, 53 Pages, pp. 3.5,7,8 pp. 14,15 pp. 31-33, pp. 32-35.

(Continued)

*Primary Examiner* — Jung H Park
(74) *Attorney, Agent, or Firm* — Patterson + Sheridan, LLP

(57) ABSTRACT

Certain aspects of the present disclosure provide techniques for multiplexing HARQ feedback in a same slot for downlink and sidelink transmissions. An example method generally includes receiving, from a network entity, a downlink
(Continued)

control information (DCI) that schedules resources for at least one physical sidelink shared channel (PSSCH) transmission from the first UE to a second UE, transmitting data to the second UE via the at least one PSSCH transmission using the scheduled resources, receiving, from the second UE, acknowledgment feedback for the at least one PSSCH transmission, selecting at least one codebook entry for providing feedback for at least one downlink transmission from the network entity to the first UE and the acknowledgment feedback for the at least one PSSCH transmission in a same physical uplink control channel (PUCCH) slot, and transmitting the at least one codebook entry to the network entity via at least one PUCCH transmission.

28 Claims, 10 Drawing Sheets

(51) Int. Cl.
  *H04L 1/1829* (2023.01)
  *H04W 72/21* (2023.01)
  *H04W 72/23* (2023.01)

(56) References Cited

U.S. PATENT DOCUMENTS

| | | | |
|---|---|---|---|
| 2022/0140958 A1 | 5/2022 | Zhou et al. | |
| 2022/0279545 A1* | 9/2022 | Yoshioka | H04W 76/15 |
| 2022/0321278 A1* | 10/2022 | Yoshioka | H04L 1/1854 |

FOREIGN PATENT DOCUMENTS

| | | |
|---|---|---|
| EP | 4002736 A1 | 5/2022 |
| WO | 2019004883 A1 | 1/2019 |
| WO | 2019098896 A1 | 5/2019 |

OTHER PUBLICATIONS

Ericsson: "Uu-based Sidelink Resource Allocation", 3GPP TSG-RAN WG1 Meeting #98bis, R1-1910533, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 7, 2019, 22 Pages, XP051808934, pp. 9-11.

Supplementary European Search Report—EP19949853—Search Authority—The Hague—Jun. 27, 2023.

Vivo: "Discussion on Mode 1 Resource Allocation Mechanism", 3GPP TSG RAN WG1 Meeting #98bis, R1-1911419, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, 15 Pages, Oct. 13, 2019, XP051800859, p. 6-p. 7, p. 4, Figures 4-10, Section 2.2.

International Search Report and Written Opinion—PCT/CN2019/113270—ISAEPO—Jul. 29, 2020.

Qualcomm Incorporated: "UCI Enhancements for eURLLC", 3GPP Drait, 3GPP TSG-RAN WG1 #98,R1-1909575, UCI Enhancements for eURLLC, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Sep. 3, 2019 (Sep. 3, 2019), pp. 1-22, XP0517 66712, Retrieved from the Internet: URL: http://www.3gpp.org/ftp/tsg_ran/WG1_RL1 /TSGR1_98 /Docs /R1-190957 5.zip.

Samsung: "Summary of Draft CRs on CA and HARQ-ACK Codebook for Rel-15 NR", 3GPP Draft, 3GPP TSG RAN WG1 #98, R1-1909494, Prague, Czech Republic, Aug. 26-30, 2019, Sep. 3, 2019 (Sep. 3, 2019), pp. 1-8, the whole document.

VIVO: "Discussion on Mode 1 Resource Allocation Mechanism", 3GPP TSG RAN WG1 Meeting #98bis, R1-1911419, Chongqing, China, Oct. 14-20, 2019, 15 pages, Oct. 22, 2019.

* cited by examiner

Illustration of option 1, according to the last feedback resource indicated over the corresponding PSSCH(s) reception/observation occasions

HYBRID AUTOMATIC REPEAT REQUEST (HARQ) CODEBOOK ENHANCEMENT AND PHYSICAL UPLINK CONTROL CHANNEL (PUCCH) RESOURCE DETERMINATION WITH SIDELINK FEEDBACK FORWARDING

CROSS-REFERENCE TO RELATED APPLICATIONS

This Application is a 371 National Phase Application of International Patent Application No. PCT/CN2019/113270, filed on Oct. 25, 2019, the entire contents of which are incorporated herein by reference.

FIELD OF THE DISCLOSURE

Aspects of the present disclosure relate to wireless communications, and more particularly, to techniques for transmitting downlink and sidelink feedback from a transmitting user equipment (UE).

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment (UE). The method generally includes receiving, from a network entity, a downlink control information (DCI) that schedules resources for at least one physical sidelink shared channel (PSSCH) transmission from the first UE to a second UE, transmitting data to the second UE via the at least one PSSCH transmission using the scheduled resources, receiving, from the second UE, acknowledgment feedback for the at least one PSSCH transmission, selecting at least one codebook entry for providing feedback for at least one downlink transmission from the network entity to the first UE and the acknowledgment feedback for the at least one PSSCH transmission in a same physical uplink control channel (PUCCH) slot, and transmitting the at least one codebook entry to the network entity via at least one PUCCH transmission.

Certain aspects provide a first user equipment (UE). The first UE generally includes a receiver configured to receive, from a network entity, a downlink control information (DCI) that schedules resources for at least one physical sidelink shared channel (PSSCH) transmission from the first UE to a second UE, a transmitter configured to transmit data to the second UE via the at least one PSSCH transmission using the scheduled resources, wherein the receiver is further configured to receive, from the second UE, acknowledgment feedback for the at least one PSSCH transmission and a processing system configured to select at least one codebook entry for providing feedback for at least one downlink transmission from the network entity to the first UE and the acknowledgment feedback for the at least one PSSCH transmission in a same physical uplink control channel (PUCCH) slot, wherein the transmitter is further configured to transmit the at least one codebook entry to the network entity via at least one PUCCH transmission.

Certain aspects provide a first UE. The first UE generally includes means for receiving, from a network entity, a downlink control information (DCI) that schedules resources for at least one physical sidelink shared channel (PSSCH) transmission from the first UE to a second UE, means for transmitting data to the second UE via the at least one PSSCH transmission using the scheduled resources, means for receiving, from the second UE, acknowledgment feedback for the at least one PSSCH transmission, means for selecting at least one codebook entry for providing feedback for at least one downlink transmission from the network entity to the first UE and the acknowledgment feedback for the at least one PSSCH transmission in a same physical uplink control channel (PUCCH) slot and means for transmitting the at least one codebook entry to the network entity via at least one PUCCH transmission.

Certain aspects provide an apparatus for wireless communications by a first user equipment (UE). The apparatus generally includes a processing system configured to generate data and an interface configured to obtain, from a network entity, a downlink control information (DCI) that schedules resources for at least one physical sidelink shared channel (PSSCH) transmission from the first UE to a second UE, output the generated data for transmission to the second UE via the at least one PSSCH transmission using the scheduled resources and obtain, from the second UE, acknowledgment feedback for the at least one PSSCH transmission, wherein the processing system is further configured to select at least one codebook entry for providing feedback for at least one downlink transmission from the network entity to the first UE and the acknowledgment feedback for the at least one PSSCH transmission in a same physical uplink control channel (PUCCH) slot, wherein the transmitter is further configured to transmit the at least one codebook entry to the network entity via at least one PUCCH transmission.

Certain aspects provide a computer-readable medium for wireless communications comprising instructions executable to receive, from a network entity, a downlink control information (DCI) that schedules resources for at least one physical sidelink shared channel (PSSCH) transmission from the first UE to a second UE, transmit data to the second UE via the at least one PSSCH transmission using the scheduled resources, receive, from the second UE, acknowledgment feedback for the at least one PSSCH transmission, select at least one codebook entry for providing feedback for at least one downlink transmission from the network entity to the first UE and the acknowledgment feedback for the at least one PSSCH transmission in a same physical uplink control channel (PUCCH) slot and transmit the at least one codebook entry to the network entity via at least one PUCCH transmission.

Certain aspects provide a method for wireless communications by a network entity. The method generally includes transmitting, to a first user equipment (UE), a downlink control information (DCI) that schedules resources for at least one physical sidelink shared channel (PSSCH) transmission from the first UE to a second UE, receiving, from the first UE in a same physical uplink control channel (PUCCH) slot, at least one codebook entry for providing feedback for at least one downlink transmission from the network entity to the first UE and acknowledgment feedback for the at least one PSSCH transmission, and determining, based on the at least one codebook entry, whether to retransmit the at least one downlink transmission to the first UE and whether to transmit, to the first UE, another DCI scheduling resources for retransmission of the at least one PSSCH transmission from the first UE to the second UE.

Certain aspects provide a network entity. The network entity generally includes a transmitter configured to transmit, to a first user equipment (UE), a downlink control information (DCI) that schedules resources for at least one physical sidelink shared channel (PSSCH) transmission from the first UE to a second UE, a receiver configured to receive, from the first UE in a same physical uplink control channel (PUCCH) slot, at least one codebook entry for providing feedback for at least one downlink transmission from the network entity to the first UE and acknowledgment feedback for the at least one PSSCH transmission and a processing system configured to determine, based on the at least one codebook entry, whether to retransmit the at least one downlink transmission to the first UE and whether to transmit, to the first UE, another DCI that schedules resources for retransmission of the at least one PSSCH transmission from the first UE to the second UE.

Certain aspects provide a network entity. The network entity generally includes means for transmitting, to a first user equipment (UE), a downlink control information (DCI) that schedules resources for at least one physical sidelink shared channel (PSSCH) transmission from the first UE to a second UE, means for receiving, from the first UE in a same physical uplink control channel (PUCCH) slot, at least one codebook entry for providing feedback for at least one downlink transmission from the network entity to the first UE and acknowledgment feedback for the at least one PSSCH transmission and means for determining, based on the at least one codebook entry, whether to retransmit the at least one downlink transmission to the first UE and whether to transmit, to the first UE, another DCI that schedules resources for retransmission of the at least one PSSCH transmission from the first UE to the second UE.

Certain aspects provide an apparatus for wireless communications by a network entity. The apparatus generally includes a processing system configured to generate a downlink control information (DCI) that schedules resources for at least one physical sidelink shared channel (PSSCH) transmission from a first user equipment (UE) to a second UE and an interface configured to provide the downlink control information (DCI) that schedules resources for at least one physical sidelink shared channel (PSSCH) transmission from the first UE to the second UE for transmission to the first user equipment (UE) and obtain, from the first UE in a same physical uplink control channel (PUCCH) slot, at least one codebook entry for providing feedback for at least one downlink transmission from the network entity to the first UE and acknowledgment feedback for the at least one PSSCH transmission, wherein the processing system is further configured to determine, based on the at least one codebook entry, whether to retransmit the at least one downlink transmission to the first UE and whether to transmit, to the first UE, another DCI that schedules resources for retransmission of the at least one PSSCH transmission from the first UE to the second UE.

Certain aspects provide a computer-readable medium comprising instructions for wireless communications executable to transmit, to a first user equipment (UE), a downlink control information (DCI) that schedules resources for at least one physical sidelink shared channel (PSSCH) transmission from the first UE to a second UE, receive, from the first UE in a same physical uplink control channel (PUCCH) slot, at least one codebook entry for providing feedback for at least one downlink transmission from the network entity to the first UE and acknowledgment feedback for the at least one PSSCH transmission and determine, based on the at least one codebook entry, whether to retransmit the at least one downlink transmission to the first UE and whether to transmit, to the first UE, another DCI that schedules resources for retransmission of the at least one PSSCH transmission from the first UE to the second UE.

Certain aspects provide means for, apparatus, and/or computer readable medium having computer executable code stored thereon, for performing the techniques described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
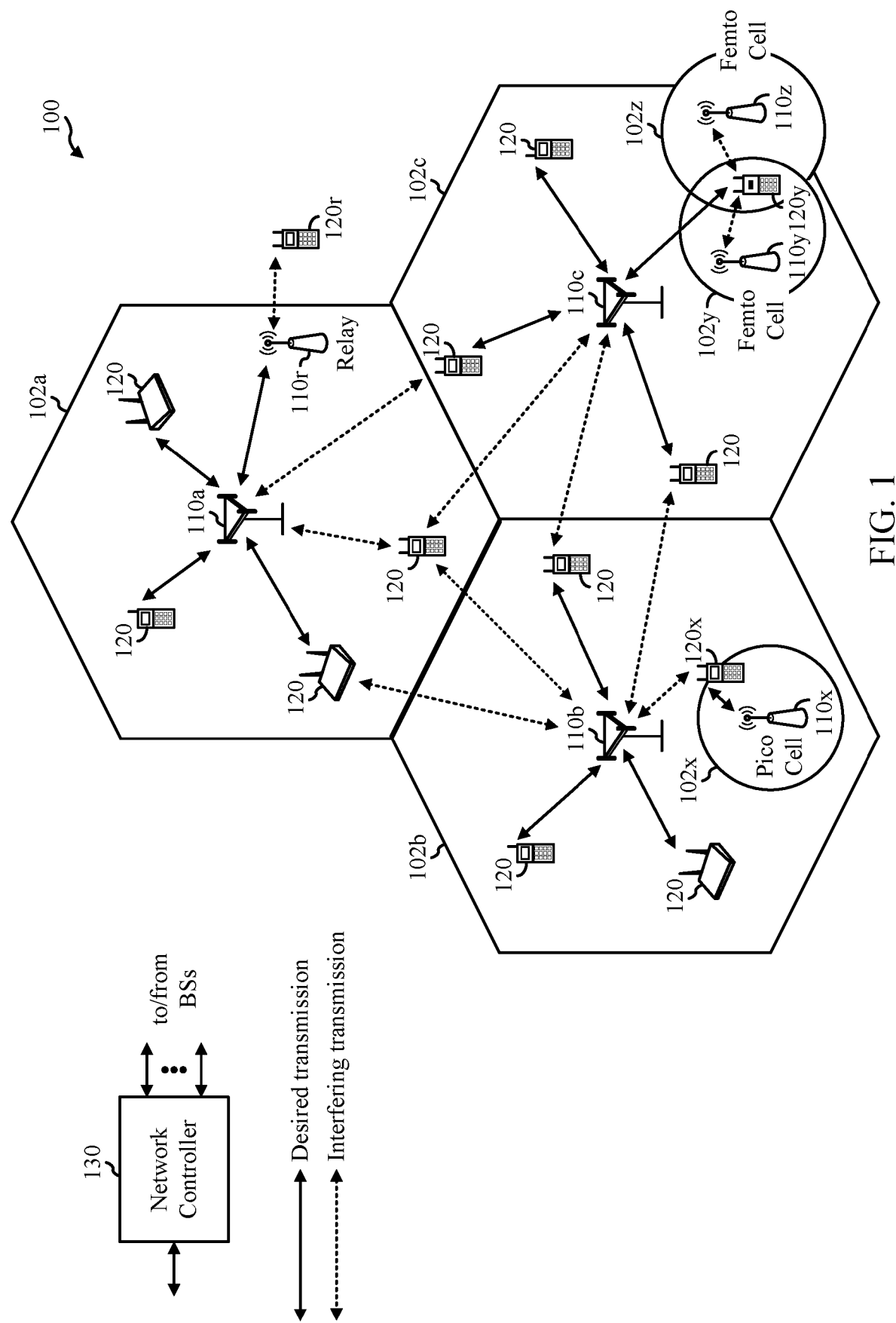
FIG. 1 is a block diagram conceptually illustrating an example telecommunications system, in accordance with certain aspects of the present disclosure.

Aspects of the present disclosure provide apparatus, methods, processing systems, and computer readable mediums for transmitting downlink and sidelink feedback from a transmitting user equipment (UE).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, UEs 120 of FIG. 1 may be configured to perform operations described below with reference to FIGS. 8, 12, and/or 13, to process SPS transmissions in multi-TRP systems.

The wireless communication network 100 may be, for example, a New Radio (NR) or 5G network. BSs 110 may be involved in a multiple transmission reception point (multi-TRP) transmission to a UE 120, in accordance with operations described below with reference to FIGS. 8, 12, and 13 below.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
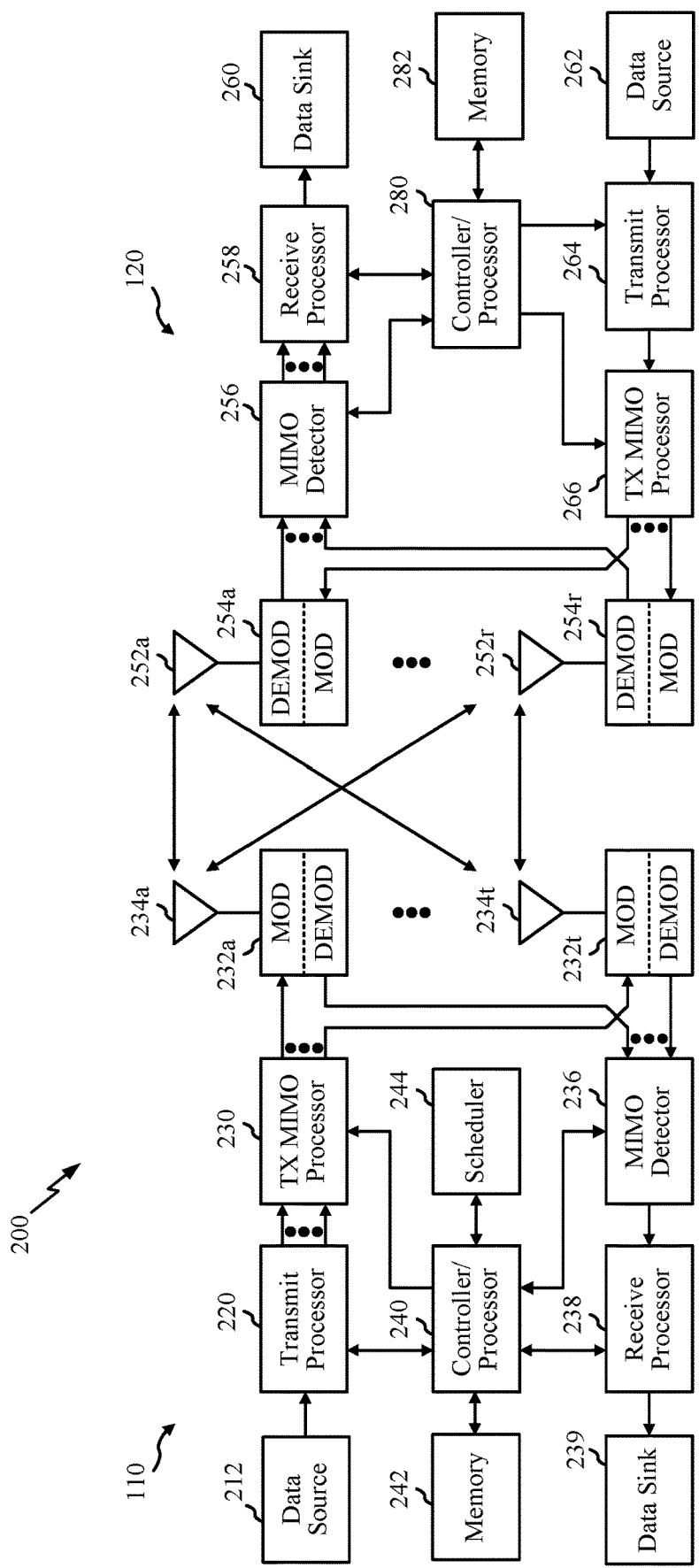
FIG. 2 is a block diagram conceptually illustrating a design of an example base station (BS) and user equipment (UE), in accordance with certain aspects of the present disclosure.

FIG. 2 illustrates example components of BS 110 and UE 120 (as depicted in FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein for rate matching for multi-TRP transmission.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a through 254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 220 and 280 may direct the operation at the BS 110 and the UE 120, respectively. The processor 220 and/or other processors and modules at the BS 110 may perform or direct the execution of processes for the techniques described herein. The memories 422 and 282 may store data and program codes for BS 110 and UE 120, respectively. A scheduler 244 may schedule UEs for data transmission on the downlink and/or uplink.

Figure 3:
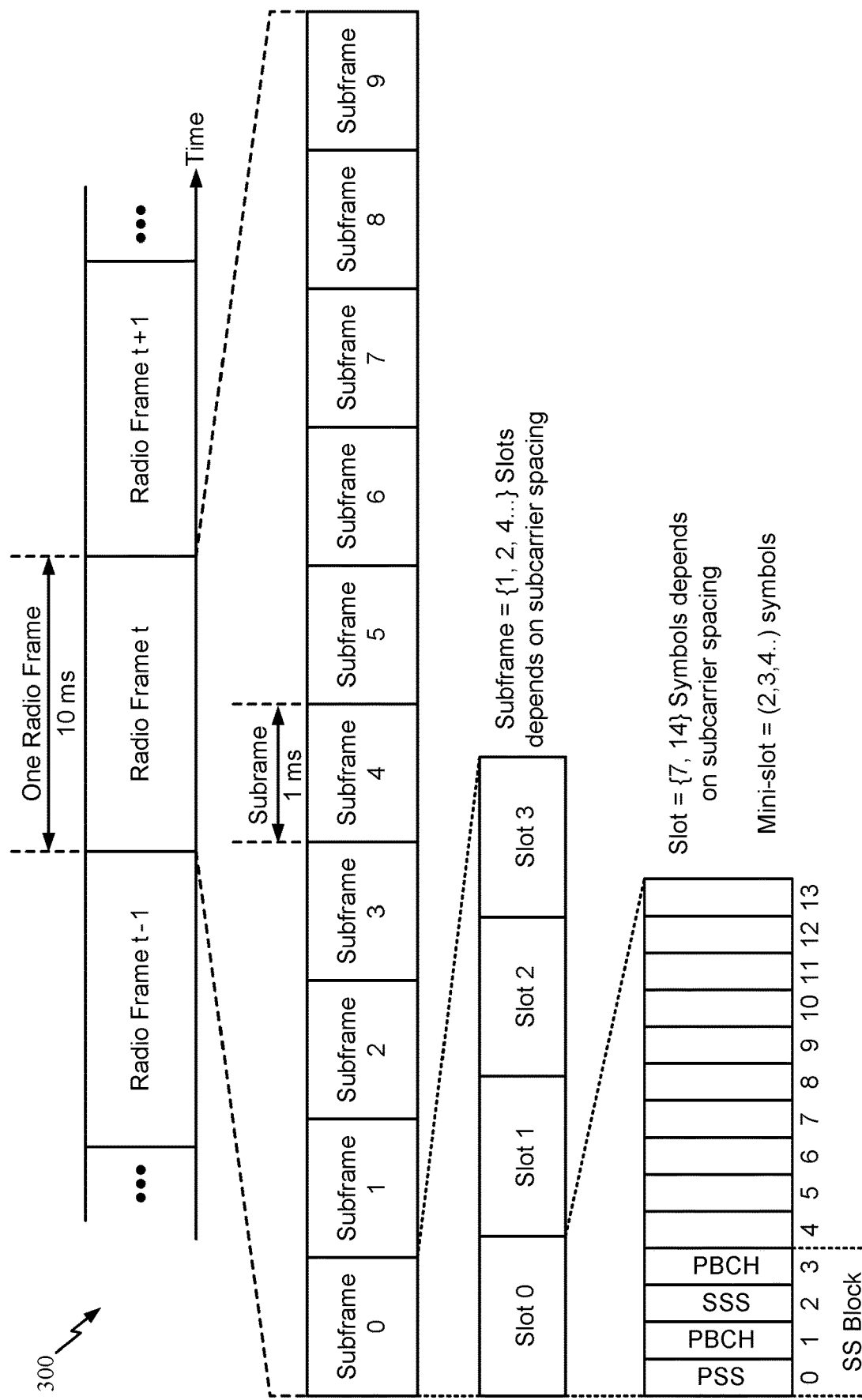
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Figure 6:
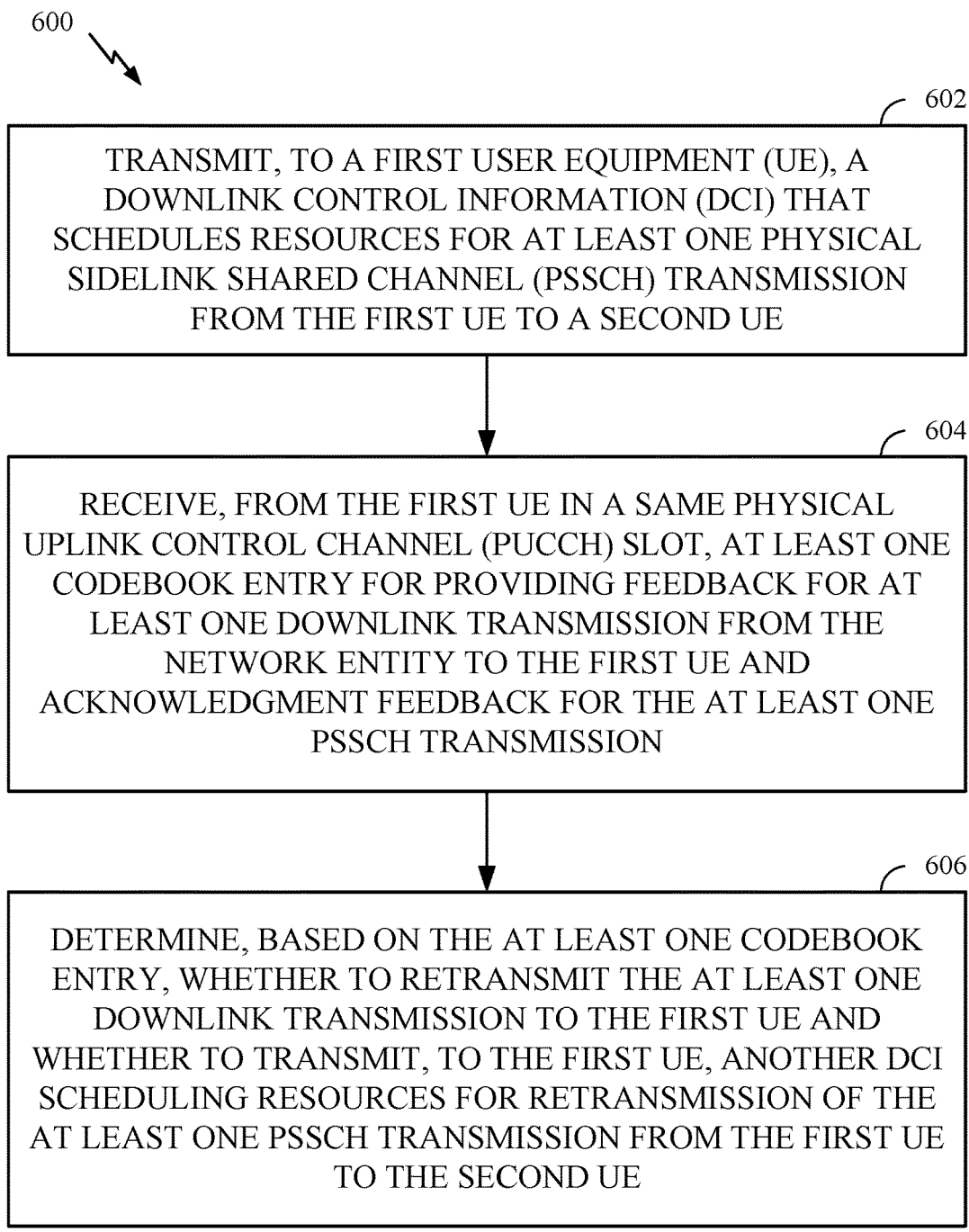
FIG. 6 is a flow diagram illustrating example operations that may be performed by a network entity, in accordance with certain aspects of the present disclosure.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example HARQ Codebook and PUCCH Resource Determination for Joint Downlink and Sidelink Feedback Reporting NR networks may provide for sidelink transmissions between a transmitter user equipment (UE) and a receiver UE. Sidelink transmissions may be scheduled by a network entity, such as a base station or gNodeB (gNB). Generally, to perform sidelink transmissions, a transmitter UE receives scheduling information from the network entity and, based on the scheduling information, transmits data to a receiver UE on the physical sidelink shared channel (PSSCH). The transmitter UE, in turn, receives hybrid automatic repeat request (HARQ) feedback (e.g., a HARQ ACK or HARQ NACK) from the receiver UE via the physical sidelink feedback channel (PSFCH). In resource allocation mode 1, the HARQ feedback received by the transmitter UE from the receiver UE is forward to the network entity via the physical uplink control channel (PUCCH) or physical uplink shared channel (PUSCH) to obtain a retransmission resource.

In some cases, transmission of HARQ feedback may be scheduled in a same PUCCH occasion (e.g., a same PUCCH slot) for both downlink transmissions and sidelink transmissions. For example, a downlink transmission and a sidelink transmission may be associated with different K1 feedback timing values such that the K1 value for providing feedback in respect of downlink transmissions from a network entity to the transmitting UE points to the same PUCCH slot as the K1 value for providing feedback in respect of sidelink transmissions forwarded by the transmitter UE to the receiver UE.

Figure 4:
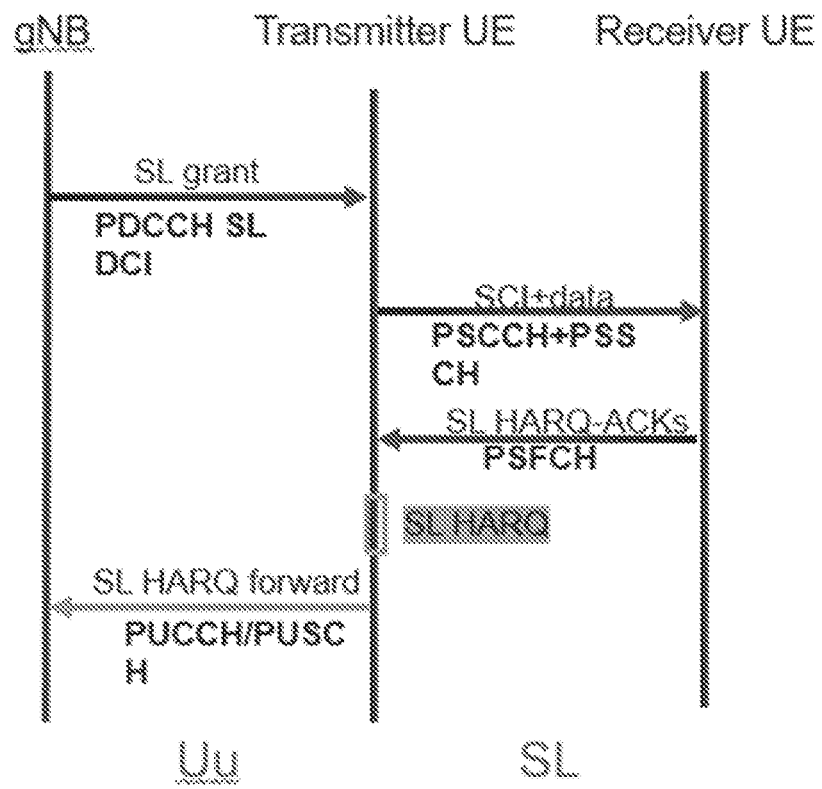
FIG. 4 illustrates example sidelink resource allocation and sidelink feedback forwarding procedure, in accordance with certain aspects of the present disclosure.

FIG. 4 illustrates an example sidelink resource allocation and sidelink feedback forwarding procedure, according to aspects described herein. In the sidelink resource allocation mode illustrated in FIG. 4, a network entity (e.g., a gNB) schedules resources for one or multiple sidelink transmissions on the physical sidelink shared channel (PSSCH) via a sidelink grant transmitted from the gNB to the transmitter UE on the physical downlink control channel (PDCCH). The transmitter UE, in turn, transmits sidelink control information (SCI) and data to the receiver UE via the physical sidelink control channel (PSCCH) and the PSSCH, respectively. Sidelink HARQ-ACK feedback is transmitted from the receiver UE (or multiple receiver UEs) to the transmitter UE via the PSFCH, and the sidelink HARQ-ACK feedback is forwarded from the transmitter UE to the gNB to request retransmission resources (e.g., when a HARQ NACK is transmitted to the gNB for a particular sidelink transmission).

Figure 5:
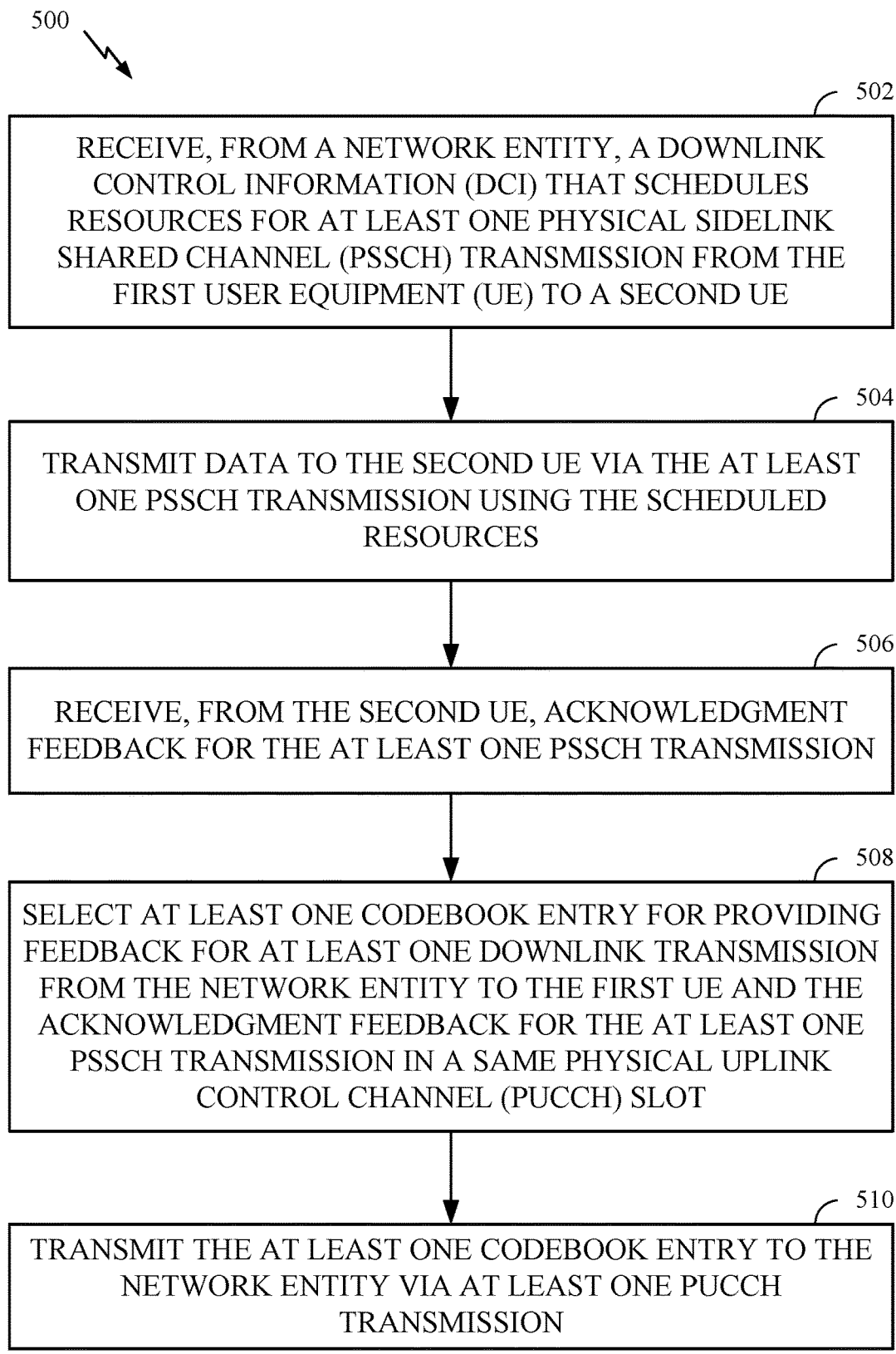
FIG. 5 is a flow diagram illustrating example operations that may be performed by a UE, in accordance with certain aspects of the present disclosure.

FIG. 5 illustrates example operations 500 for transmitting downlink and sidelink feedback from a transmitter UE in a sidelink scenario, in accordance with certain aspects of the present disclosure. The operations 500 may be performed, for example, by a first UE (e.g., such as a UE 120 in the wireless communication network 100) for processing sidelink transmissions between the first UE (acting as a transmitter UE in a sidelink scenario) and a second UE (acting as a receiver UE in a sidelink scenario).

As illustrated, operations 500 begin at 502, by receiving, from a network entity, a downlink control information (DCI) scheduling resources for at least one physical sidelink shared channel (PSSCH) transmission from a first UE to a second UE.

At 504, the first UE transmits data to the second UE via the at least one PSSCH transmission using the scheduled resources.

At 506, the first UE receives, from the second UE, acknowledgment feedback for the at least one PSSCH transmission.

At 508, the first UE selects at least one codebook entry for providing feedback for at least one downlink transmission from the network entity to the first UE and the acknowledgment feedback for the at least one PSSCH transmission in a same physical uplink control channel (PUCCH) slot.

At 510, the first UE transmits the at least one codebook entry to the network entity via at least one PUCCH transmission.

FIG. 6 illustrates example operations 600 for receiving and processing downlink and sidelink HARQ feedback from a first UE (e.g., a UE acting as a transmitting UE), in accordance with certain aspects of the present disclosure. The operations 600 may be performed, for example, by a base station (e.g., such as a BS 110 in the wireless communication network 100) to process downlink and sidelink HARQ feedback from a first UE performing operations 500 of FIG. 5.

Operations 600 may begin at 602, where a network entity transmits, to a first user equipment (UE), a downlink control information (DCI) that schedules resources for at least one physical sidelink shared channel (PSSCH) transmission from the first UE to a second UE.

At 604, the network entity receives, from the first UE in a same physical uplink control channel (PUCCH) slot, at least one codebook entry for providing feedback for at least one downlink transmission from the network entity to the first UE and acknowledgment feedback for the at least one PSSCH transmission.

At block 606, the network entity determines, based on the at least one codebook entry, whether to retransmit the at least one downlink transmission to the first UE and whether to transmit, to the first UE, another DCI scheduling resources for retransmission of the at least one PSSCH transmission from the first UE to the second UE.

In some embodiments, the selection comprises selecting a first codebook entry for providing feedback for the at least one downlink transmission from the network entity to the first UE, and selecting a second codebook entry for acknowledging the at least one PSSCH transmission. The transmission comprises transmitting the first codebook entry via a first PUCCH transmission and transmitting the second codebook entry via a second PUCCH transmission.

In some embodiments, the UE may further provide joint feedback via a single codebook entry, rather than separate feedback, when the acknowledgment feedback for the at least one downlink transmission from the network entity to the first UE and the acknowledgment feedback for the at least one PSSCH transmission are scheduled in the same PUCCH slot. The single codebook entry may be selected from a type 1 or a type 2 hybrid automatic repeat request (HARQ) Acknowledgement codebook. In some embodiments, the single codebook entry may include a first set of one or more bits for acknowledging the at least one downlink transmission and a second set of one or more bits for acknowledging the at least one PSSCH transmission.

In some embodiments, the first set of one or more bits may be concatenated with the second set of one or more bits. The bits in the first set may correspond to one or more physical downlink shared channel (PDSCH) occasions in an order in which the PDSCH occasions were scheduled, and the bits in the second set may correspond to one or more PSSCH occasions in an order in which the PSSCH occasions were scheduled.

In some embodiments, the first set of one or more bits and the second set of one or more bits may be interlaced. Each bit in the first set may correspond to a physical downlink shared channel (PDSCH) occasion, and each bit in the second set may correspond to a PSSCH occasion. Each bit may occur in the single codebook entry in an order in which their corresponding PDSCH or PSSCH occasion was scheduled.

In some embodiments, the UE further determines resources, within the PUCCH slot, for the at least one PUCCH transmission according to a rule. The rule may involve selecting resources for the at least one PUCCH transmission based on a last feedback resource indicated via the DCI that scheduled resources for the at least one PSSCH transmission. The rule may involve selecting resources for the at least one PUCCH transmission based on a last feedback resource indicated via a DCI that scheduled the at least one downlink transmission from the network entity to the first UE. The rule may involve selecting resources for the at least one PUCCH transmission based on a last feedback resource indicated via the latest received one of a DCI that scheduled the at least one downlink transmission from the network entity to the first UE and the DCI that scheduled resources for the at least one PSSCH transmission.

Figure 7:
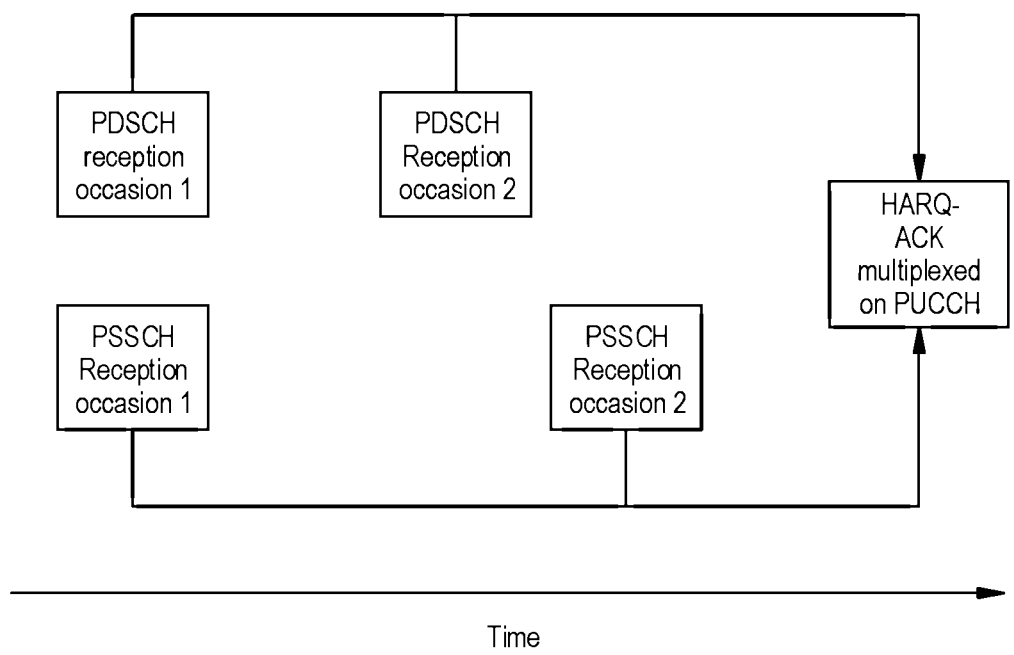
FIG. 7 illustrates an example timeline of downlink and sidelink reception with multiplexed feedback transmitted to a network entity, in accordance with certain aspects of the present disclosure.

FIG. 7 illustrates an example timeline in which downlink and sidelink feedback is scheduled for transmission by the transmitting UE to a network entity in a same PUCCH slot, in accordance with certain aspects of the present disclosure. As discussed, each PDSCH and PSSCH reception occasion may be associated with a K1 feedback timing value defining a number of slots between reception of a transmission on a channel and transmission of the HARQ feedback for that transmission. In the timeline illustrated in FIG. 7, PDSCH reception occasion 1, PDSCH reception occasion 2, PSSCH reception occasion 1, and PSSCH reception occasion 2 are associated with K1 values that result in feedback for each of these reception occasions being scheduled at the same time. In some embodiments, multiplexing of sidelink HARQ-ACK feedback with downlink HARQ-ACK feedback may be indicated by information in the DCIs associated with the downlink transmissions and the sidelink transmissions.

To allow for downlink and sidelink feedback to be multiplexed on a same PUCCH slot, codebook enhancements may be established. These codebook enhancements may be established for semi-static (type 1) and dynamic (type 2) HARQ-ACK codebooks.

In some embodiments, where sidelink HARQ-ACK feedback is forwarded to a network entity and downlink HARQ-ACK feedback is not multiplexed with the sidelink HARQ-ACK feedback, legacy codebook generation schemes may be used. To support joint HARQ-ACK feedback from a transmitter UE to a network entity (e.g., to support multiplexed sidelink and downlink HARQ-ACK feedback), two codebook options may be used. In a first option, HARQ-ACK feedback bits for downlink data (e.g., data transmitted from the network entity to the transmitter UE via the cellular Uu interface) and HARQ-ACK feedback bits for sidelink data may be concatenated in increasing order of configured scheduling form higher layers within the same reception/observation occasions. In a second option, downlink HARQ-ACK feedback bits may be interlaced with sidelink HARQ-ACK feedback bits.

Figure 8:
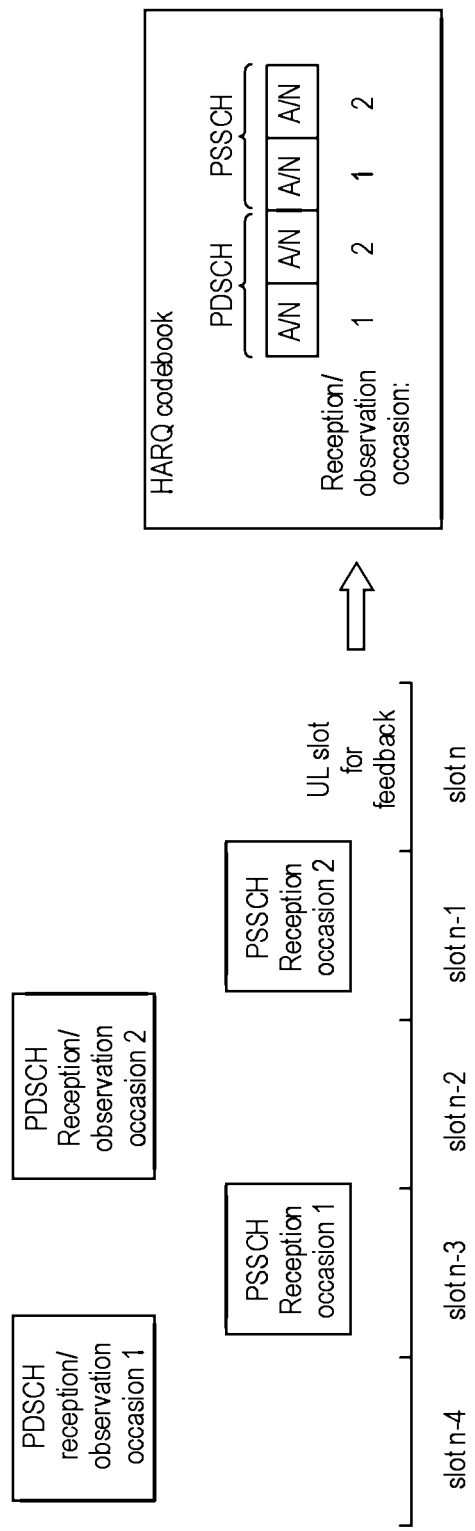
FIGS. 8-9 illustrate an example codebooks for transmission of multiplexed downlink and sidelink feedback to a network entity, in accordance with certain aspects of the present disclosure.

FIG. 8 illustrates an example codebook for concatenating downlink and sidelink HARQ-ACK feedback, in accordance with certain aspects of the present disclosure. As illustrated, HARQ-ACK feedback for both downlink and sidelink data is scheduled for slot n. A first downlink reception occasion occurs at slot n-4, and a second downlink reception occasion occurs at slot n-2. A first sidelink reception occasion occurs at slot n-3, and a second sidelink reception occasion occurs at slot n-1. To concatenate downlink and sidelink HARQ-ACK feedback, HARQ-ACK bits may be generated and sorted for downlink (e.g., PDSCH) and sidelink (e.g., PSSCH) separately. The HARQ-ACK bits generated for downlink reception occasions may be concatenated together with the HARQ-ACK bits generated for sidelink reception occasions. As illustrated, this codebook results in a reporting of HARQ-ACK bits from earliest to latest reception occasion for a first type of data reception (e.g., downlink), and then a reporting of HARQ-ACK bits from earliest to latest reception occasion for a second type of data reception (e.g., sidelink).

Figure 9:
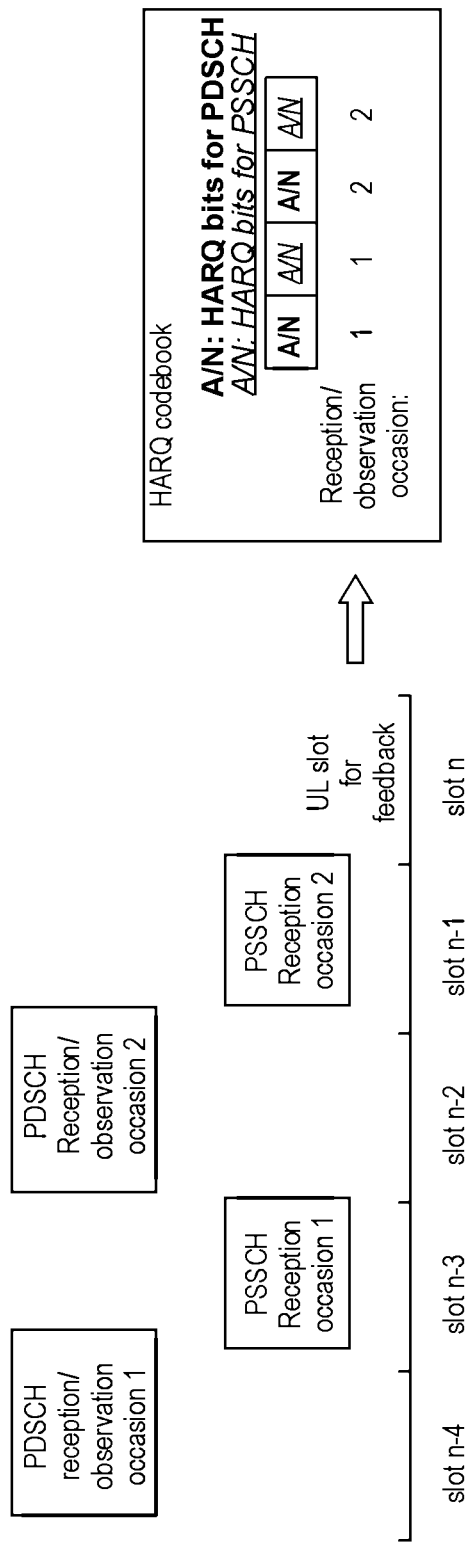

FIG. 9 illustrates an example codebook for interleaving downlink and sidelink HARQ-ACK feedback, in accordance with certain aspects of the present disclosure. Like in FIG. 8, HARQ-ACK feedback for both downlink and sidelink data is scheduled for slot n. A first downlink reception occasion occurs at slot n-4, and a second downlink reception occasion occurs at slot n-2. A first sidelink reception occasion occurs at slot n-3, and a second sidelink reception occasion occurs at slot n-1. HARQ bits for downlink and sidelink reception occasions may be generated and sorted from earliest reception to latest reception occasion separately and interlaced together. As illustrated, this codebook may result in joint HARQ-ACK feedback, with each bit in the joint HARQ-ACK feedback corresponding to the slot in which a reception occasion occurs. In the example illustrated in FIG. 9, the codebook may thus result in joint feedback with the leftmost bit corresponding to the reception occasion at slot n-4 and subsequent bits corresponding to subsequent reception occasions such that HARQ bits for downlink reception occasions are interleaved with HARQ bits for sidelink reception occasions.

When sidelink and downlink HARQ-ACK feedback is scheduled in a same PUCCH slot, two configurations may be supported based on higher layer signaling and UE capabilities. In one case, separate transmission of sidelink and downlink HARQ-ACK feedback may be supported. In a separate transmission scenario, a UE may generate HARQ-ACK information for PDSCH and/or PSSCH, respectively, and arrange the HARQ-ACK information into two HARQ-ACK codebooks. In a joint transmission scenario, the enhanced HARQ-ACK codebooks illustrated in FIGS. 8 and 9 and discussed above may be used.

In some embodiments, the UE may determine the PUCCH resource to use for a multiplexed codebook. The resource may be determined according to the last feedback resource indicated via the DCI scheduling resources for a PSSCH. The resource may be determined according to the last feedback resource indicated via the DCI scheduling resources for a PDSCH. In some embodiments, the resource may be the last feedback resource indicated via the DCI corresponding to the last reception or observation occasion prior to the slot at which feedback is to be transmitted on PUCCH.

Figure 10:
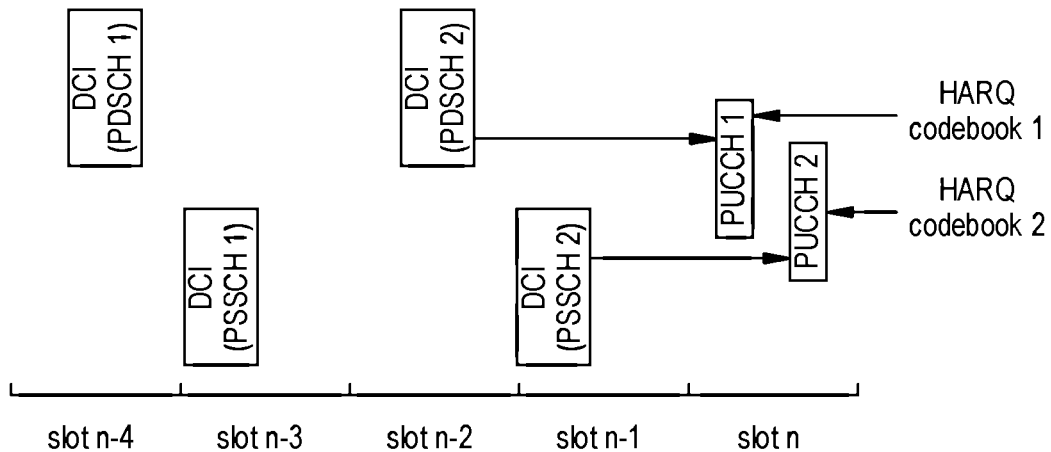
FIG. 10 illustrates an example timeline for transmitting downlink and sideline feedback, in accordance with certain aspects of the present disclosure.

FIG. 10 illustrates an example timeline for transmitting downlink and sideline feedback as separate feedback, in accordance with aspects of the present disclosure. As illustrated, DCI and a corresponding PDCCH is received at slot n-4 and slot n-2, with K1 values resulting in the feedback being transmitted in slot n. DCI and a corresponding PSSCH is received at slots n-3 and n-1, with K1 values also resulting in the feedback being transmitted in slot n. To allow for separate reporting of downlink and sidelink HARQ ACK feedback, downlink and sidelink HARQ feedback may be reported in different portions of slot n using time domain multiplexing. A first portion of slot n may be used to transmit downlink HARQ ACK feedback according to a first codebook, and a second portion of slot n may be used to forward sidelink feedback according to a second codebook.

Figure 11:
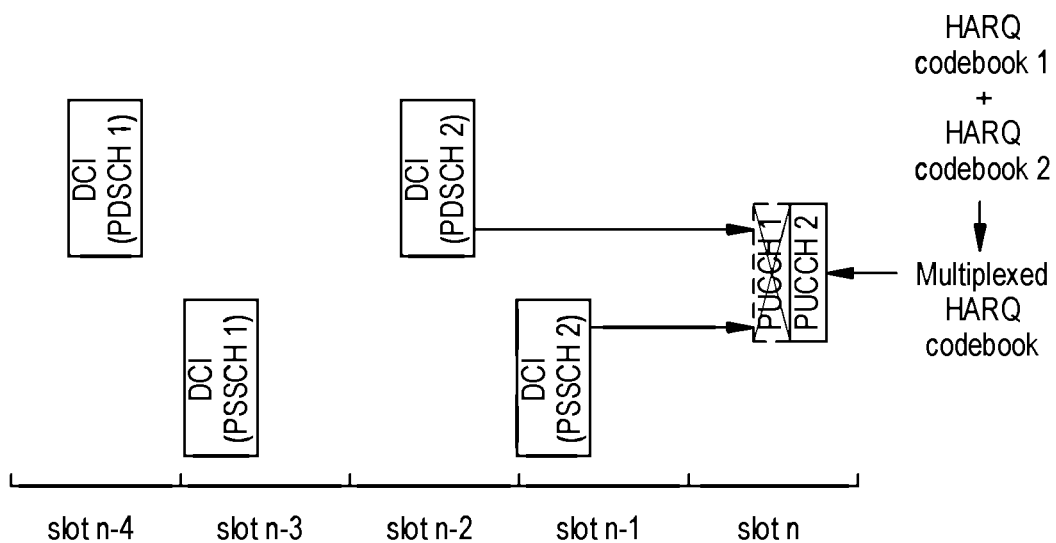
FIG. 11 illustrates an example timeline for transmitting joint downlink and sidelink feedback, in accordance with certain aspects of the present disclosure.

FIG. 11 illustrates an example timeline for transmitting multiplexed joint downlink and sideline feedback, in accordance with aspects of the present disclosure. As in FIG. 10, DCI and a corresponding PDCCH is received at slot n-4 and slot n-2, with K1 values resulting in the feedback being transmitted in slot n. DCI and a corresponding PSSCH is received at slots n-3 and n-1, with K1 values also resulting in the feedback being transmitted in slot n. To jointly transmit feedback for both downlink and sidelink transmission, the resource to be used may be determined based on the DCI for either the downlink or sidelink reception occasions, as discussed above, and feedback may be multiplexed in the same PUCCH resource.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components. For example, various operations shown in FIG. 5 may be performed by various processors shown in FIG. 2, such as processors 266, 258, 264, and/or controller/processor 280 of the UE 120. Various operations shown in FIG. 6 may be performed by various processors shown in FIG. 2, such as processors 220, 230, 238, and/or controller/processor 240 of the BS 110.

Means for receiving may include a receiver (such as one or more antennas or receive processors) illustrated in FIG. 2. Means for selecting, means for providing, means for determining and means for processing may include a processing system, which may include one or more processors, such as processors 266, 258, 264, and/or controller/processor 280 of the UE 120 and/or processors 220, 230, 238, and/or controller/processor 240 of the BS 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 5 and/or 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be used.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications at by a first user equipment (UE), comprising:

receiving, from a network entity, a downlink control information (DCI) that schedules resources for at least one physical sidelink shared channel (PSSCH) transmission from the first UE to a second UE;

transmitting data to the second UE via the at least one PSSCH transmission using via the scheduled resources;

receiving, from the second UE, an acknowledgment feedback for the at least one PSSCH transmission in a first slot associated with a first feedback timing value, wherein the first feedback timing value indicates a first number of slots between reception of the acknowledgment feedback and transmission of the acknowledgment feedback;

receiving at least one downlink transmission from the network entity in a second slot associated with a second feedback timing value, wherein the second feedback timing value indicates a second number of slots between reception of the at least one downlink transmission and transmission of a feedback for the at least one downlink transmission, and wherein different feedback timing values associated with the first slot and the second slot correspond to a third slot;

selecting at least one codebook entry for providing the feedback for the at least one downlink transmission and the acknowledgment feedback for the at least one PSSCH transmission in the third slot; and transmitting the at least one codebook entry to the network entity via at least one physical uplink control channel (PUCCH) transmission in the third slot.

2. The method of claim 1, further comprising:

selecting a first codebook entry for providing the feedback for the at least one downlink transmission from the network entity to the first UE;

selecting a second codebook entry for acknowledging the at least one PSSCH transmission;

transmitting the first codebook entry via a first PUCCH transmission; and transmitting the second codebook entry via a second PUCCH transmission.

3. The method of claim 1, further comprising:

determining that the feedback for the at least one downlink transmission from the network entity to the first UE and the acknowledgment feedback for the at least one PSSCH transmission are scheduled in the third slot; and providing a joint feedback via a single codebook entry based on the determination.

4. The method of claim 3, further comprising selecting the single codebook entry from a type 1 or a type 2 hybrid automatic repeat request (HARQ) acknowledgement codebook.

5. The method of claim 3, wherein the single codebook entry comprises:

a first set of one or more bits for acknowledging the at least one downlink transmission; and a second set of one or more bits for acknowledging the at least one PSSCH transmission.

6. The method of claim 5, wherein the first set of bits are concatenated with the second set of bits.

7. The method of claim 6, wherein:

bits in the first set correspond to one or more physical downlink shared channel (PDSCH) occasions in an order in which the one or more PDSCH occasions were scheduled; and bits in the second set correspond to one or more PSSCH occasions in an order in which the one or more PSSCH occasions were scheduled.

8. The method of claim 5, wherein bits in the first set and the second set are interlaced.

9. The method of claim 8, wherein:
each bit in the first set corresponds to a physical downlink shared channel (PDSCH) occasion;
each bit in the second set corresponds to a PSSCH occasion; and
each bit occurs in the single codebook entry in an order in which its corresponding PDSCH or PSSCH occasion was scheduled.

10. The method of claim 5, wherein:
each bit in the first set corresponds to a physical downlink shared channel (PDSCH) occasion;
each bit in the second set corresponds to a PSSCH occasion; and
each bit occurs in the single codebook entry in an order in which their corresponding PDSCH or PSSCH occasion was scheduled.

11. The method of claim 1, further comprising determining resources, within the third slot, for the at least one PUCCH transmission according to a rule.

12. The method of claim 11, further comprising selecting the resources for the at least one PUCCH transmission based on a last feedback resource indicated via the DCI that scheduled resources for the at least one PSSCH transmission according to the rule.

13. The method of claim 11, further comprising selecting the resources for the at least one PUCCH transmission based on a last feedback resource indicated via another DCI that scheduled the at least one downlink transmission from the network entity to the first UE according to the rule.

14. The method of claim 11, further comprising selecting the resources for the at least one PUCCH transmission based on a last feedback resource indicated via a latest received one of another DCI that scheduled the at least one downlink transmission from the network entity to the first UE and the DCI that scheduled resources for the at least one PSSCH transmission according to the rule.

15. A An apparatus for wireless communications at a first user equipment (UE), comprising:
one or more memories comprising instructions; and
one or more processors configured to execute the instructions and cause the apparatus to:
receive, from a network entity, a downlink control information (DCI) that schedules resources for at least one physical sidelink shared channel (PSSCH) transmission from the first UE to a second UE;
transmit data to the second UE via the at least one PSSCH transmission using the scheduled resources;
receive, from the second UE, an acknowledgment feedback for the at least one PSSCH transmission in a first slot associated with a first feedback timing value, wherein the first feedback timing value indicates a first number of slots between reception of the acknowledgment feedback and transmission of the acknowledgment feedback;
receive at least one downlink transmission from the network entity in a second slot associated with a second feedback timing value, wherein the second feedback timing value indicates a second number of slots between reception of the at least one downlink transmission and transmission of a feedback for the at least one downlink transmission, and wherein different feedback timing values associated with the first slot and the second slot correspond to a third slot;
select at least one codebook entry for providing the feedback for the at least one downlink transmission and the acknowledgment feedback for the at least one PSSCH transmission in the third slot; and
transmit the at least one codebook entry to the network entity via at least one physical uplink control channel (PUCCH) transmission in the third slot.

16. The apparatus of claim 15, wherein the one or more processors are configured to execute the instructions and cause the apparatus to:
select a first codebook entry for providing the feedback for the at least one downlink transmission from the network entity to the first UE;
select a second codebook entry for acknowledging the at least one PSSCH transmission;
transmit the first codebook entry via a first PUCCH transmission; and
transmit the second codebook entry via a second PUCCH transmission.

17. The apparatus of claim 15, wherein the one or more processors are configured to execute the instructions and cause the apparatus to:
determine that the feedback for the at least one downlink transmission from the network entity to the first UE and the acknowledgment feedback for the at least one PSSCH transmission are scheduled in the third slot; and
provide a joint feedback via a single codebook entry based on the determination.

18. The apparatus of claim 17, wherein the one or more processors are configured to execute the instructions and cause the apparatus to select the single codebook entry from a type 1 or a type 2 hybrid automatic repeat request (HARQ) acknowledgement codebook.

19. The apparatus of claim 17, wherein the single codebook entry comprises:
a first set of one or more bits for acknowledging the at least one downlink transmission; and
a second set of one or more bits for acknowledging the at least one PSSCH transmission.

20. The apparatus of claim 19, wherein the first set of bits are concatenated with the second set of bits.

21. The apparatus of claim 20, wherein:
bits in the first set correspond to one or more physical downlink shared channel (PDSCH) occasions in an order in which the one or more PDSCH occasions were scheduled; and
bits in the second set correspond to one or more PSSCH occasions in an order in which the one or more PSSCH occasions were scheduled.

22. The apparatus of claim 19, wherein bits in the first set and the second set are interlaced.

23. The apparatus of claim 22, wherein:
each bit in the first set corresponds to a physical downlink shared channel (PDSCH) occasion;
each bit in the second set corresponds to a PSSCH occasion; and
each bit occurs in the single codebook entry in an order in which its corresponding PDSCH or PSSCH occasion was scheduled.

24. The apparatus of claim 15, wherein the one or more processors are configured to execute the instructions and cause the apparatus to determine resources, within the third slot, for the at least one PUCCH transmission according to a rule.

25. The apparatus of claim 24, wherein the one or more processors are configured to execute the instructions and cause the apparatus to select the resources for the at least one PUCCH transmission based on a last feedback resource indicated via the DCI that scheduled resources for the at least one PSSCH transmission according to the rule.

26. The apparatus of claim 24, wherein the one or more processors are configured to execute the instructions and cause the apparatus to select the resources for the at least one PUCCH transmission based on a last feedback resource indicated via another DCI that scheduled the at least one downlink transmission from the network entity to the first UE according to the rule.

27. The apparatus of claim 24, wherein the one or more processors are configured to execute the instructions and cause the apparatus to select the resources for the at least one PUCCH transmission based on a last feedback resource indicated via a latest received one of another DCI that scheduled the at least one downlink transmission from the network entity to the first UE and the DCI that scheduled resources for the at least one PSSCH transmission according to the rule.

28. A non-transitory computer-readable medium comprising computer-executable instructions that, when executed by one or more processors of a first user equipment (UE), cause the first UE to perform a method of wireless communications, comprising:

receiving, from a network entity, a downlink control information (DCI) that schedules resources for at least one physical sidelink shared channel (PSSCH) transmission from the first UE to a second UE;

transmitting data to the second UE via the at least one PSSCH transmission using the scheduled resources;

receiving, from the second UE, an acknowledgment feedback for the at least one PSSCH transmission in a first slot associated with a first feedback timing value, wherein the first feedback timing value indicates a first number of slots between reception of the acknowledgment feedback and transmission of the acknowledgment feedback;

receiving at least one downlink transmission from the network entity in a second slot associated with a second feedback timing value, wherein the second feedback timing value indicates a second number of slots between reception of the at least one downlink transmission and transmission of a feedback for the at least one downlink transmission, and wherein different feedback timing values associated with the first slot and the second slot correspond to a third slot;

selecting at least one codebook entry for providing the feedback for the at least one downlink transmission and the acknowledgment feedback for the at least one PSSCH transmission in the third slot; and transmitting the at least one codebook entry to the network entity via at least one physical uplink control channel (PUCCH) transmission in the third slot.

* * * * *